United States Patent Office 3,443,697
Patented May 13, 1969

3,443,697
PLURAL, INVERTED, CUP-SHAPED
FILTER ELEMENTS
Ernie G. Seggebruch, East Moline, Ill., assignor to
 Ametek, Inc., New York, N.Y., a corporation of
 Delaware
Filed Mar. 23, 1967, Ser. No. 625,477
Int. Cl. B01d 29/42
U.S. Cl. 210—344                                    3 Claims

ABSTRACT OF THE DISCLOSURE

An assembly of filter elements including a plurality of cup-shaped filter plates vertically stacked in inverted positions with each filter plate having an interrupted rim about the outer periphery of the top surface of its horizontal wall so that the filtrate is discharged from between the filter plates through the openings formed in the rims.

---

The present invention relates to pressure filter devices of the type having a vertical series of cup-shaped filter plates and more particularly to the structure about the peripheries of the filter plates to permit the discharge of fitrate from the filter spaces defined between the filter plates.

Pressure filter devices comprising a vertical stack of filter plates with filtering materials therebetween have been used in a number of industries where it is necessary to have a filter apparatus that can be readily and completely dismantled to permit thorough cleaning. The liquid to be filtered is introduced upwardly through the center of the stack of filter plates and then introduced into the filter spaces defined between the filter plates. The liquid then flows radially outwardly over the filtering material and exits through openings in the outer edges of the filter plates. The stack of filter plates is enclosed within a pressure tank spaced outwardly from the outer edges of the filter plates so as to define an annular space. The filtrate flows downwardly in this annular space to the bottom of the tank where it is withdrawn.

A large number of filter plate structures have been proposed in order to effectively filter a liquid while maintaining the filter plate structure as simple as possible. Various arrangements of rings surrounding the individual filter plates and openings in the outer edges of the filter plates have been suggested in order to improve the efficiency of such filtering operations. Such filter plates were of necessity manufactured with close tolerances in order to clamp evenly the filter elements and to prevent leaks and bypassing.

It is an object of the present invention to provide a filter plate for a simpler assembly of filter elements in a pressure filter device.

It is another object of the present invention to provide such a filter plate which more effectively exists the filtrate from the outer edges of the filter plates.

In one aspect of the present invention there is provided a filter element assembly comprising a plurality of cup-shaped filter plates vertically stacked in inverted positions. Each plate has a substantially horizontal wall with an outer vertical wall at the peripheral edge and an inner vertical wall adjacent and surrounding the apertured centers of the plates. Each plate has an aperture at its center so that the stacked plates provide a vertical passage through the assembly of filter elements. The filter plates are so positioned with respect to each other that a filter space within each plate opens downwardly to the top of the horizontal wall of the next lower filter plate. On the top face of the horizontal wall of each filter plate there are concentric radially spaced discontinuous circular ribs. A separator screen means is provided in each filter space and rests on the ribs of the next lower filter plate. A sheet of filtering material is positioned upon each separator screen means. Openings are provided in the inner vertical walls of the filter plate for introducing the liquid to be filtered into the filter spaces above the sheets of filtering material. The solids which are filtered from the liquid accumulate on the filtering material and progressively form a filter cake thereon. On the peripheral edge of the top face of the horizontal wall of each filter plate, there is provided a raised rim having a plurality of openings or slots therein. The lower edge of the outer vertical wall of the next higher filter plate rests upon this rim. The filtrate passing through the sheet of filtering material exits from the assembly through the slots in the rims of the filter plates.

The peripheral rim may be of a uniform width and height and the slots or openings therein are non-uniformly spaced in the rim.

Other objects and advantages of the invention will become apparent upon reference to the accompanying description when taken in conjunction with the following drawings, which are merely exemplary.

Figure 1:
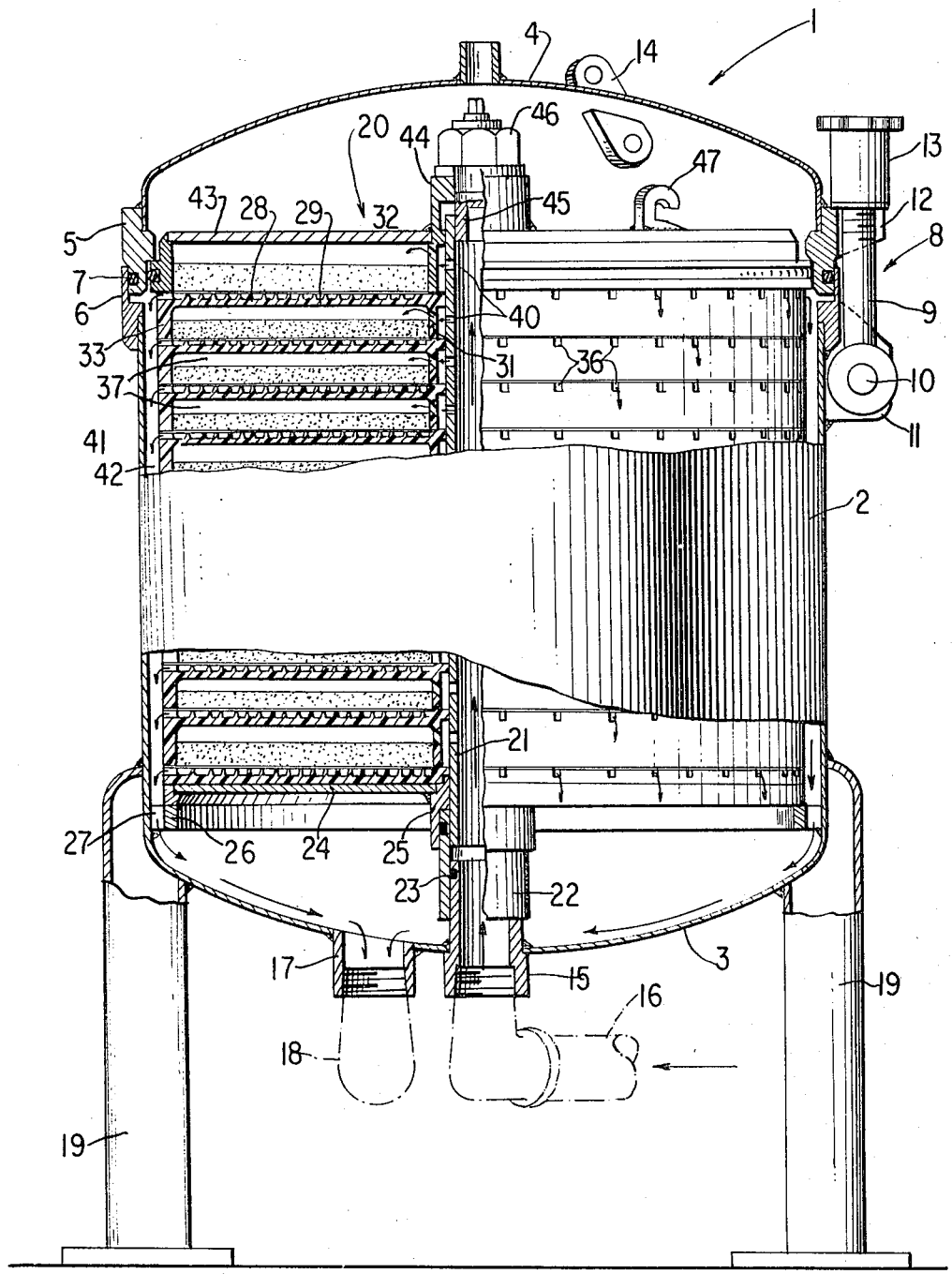
FIG. 1 is a partial vertical sectional view of a pressure filter device embodying the filter plates according to the present invention.

The pressure filter device of the present invention is indicated generally at 1 and may comprise an outer tank or casing having a vertical cylindrical side wall 2, a disk bottom wall 3 welded to the lower edge of side wall 2 and a removable domed top closure member 4 having a rim 5 along its lower edge fitting into a correspondingly shaped rim 6 on the upper edge of side wall 3. A sealing ring 7 may be positioned between rims 5 and 6 and suitable clamping devices are employed for releasably holding closure member 4 onto the tank 2.

One form of a suitable clamping device is indicated generally at 8 in FIG. 1 and may include an eye bolt 9 pivoted on a pin 10 carried by a bracket 11 welded to the rim 6 and the adjacent portion of the side wall 2. The free end of bolt 9 is threaded and is received in the correspondingly shaped U-shaped lug 12 integral with the rim 5. A hold-down nut 13 is threaded on the free end of bolt 9 and engages the lug 12 to clamp the top closure member in the position as shown in FIG. 1.

Although only one clamping device 8 is illustrated in the drawing, it is to be understood that several of such clamping devices are uniformly spaced around the periphery of the top closure member.

The top closure member 4 may be provided with an aperture lifting lug 14 (only one of which is shown in the drawings) to facilitate the removal of the top closure member by a crane or the like attached to the lifting lugs after the clamping devices 8 have been released. The closure member or cover 4 may be flat or may take various other shapes as may be desired.

The liquid to be filtered is supplied to the pressure filter device through a relatively short tubular member 45 separately positioned in bottom wall 3 and is internally threaded at its lower end for connection to a pipe 16 shown in broken lines. The filtrate is withdrawn from the pressure filter device through an outlet 17 extending downwardly from the bottom wall 3 and connected to a pipe 18 (shown in broken line) for flowing the filtrate to a storage tank or the like. The pressure filter device is preferably supported on legs 19 so that the bottom wall is elevated to provide clearance between the tank and the supporting surface for accommodating the inlet for the liquid to be filtered and the outlet for the filtrate.

Within the tank, there is positioned an assembly of filter elements generally indicated at 20. The filter element assembly is removably mounted within the tank and receives the liquid to be filtered through the inlet member 15 and after the solids have been separated from the filtrate, discharges the filtrate back into the tank for withdrawal through outlet 17. According to the present invention, the assembly 20 may comprise an elongated inlet tube 21 having an enlarged collar 22 welded on its lower end to telescope over inlet member 15. A sealing or packing ring 23 may be provided between inlet member 15 and collar 22 to prevent the passage of liquid directly into the tank without first being passed through the filter element assembly 20.

The assembly 20 further comprises a bottom plate 24 having a central aperture in which a cylindrical collar 25 is welded with the collar being slidable on the inlet tube 22. At its outer periphery the bottom plate 24 is provided with a downwardly directed annular rim 26, the outer diameter of which is less than the inner diameter of the tank and spaced inwardly from the inner surface of the tank by a plurality of radial lugs 27. If desired, the bottom plate may be of integral construction.

According to the present invention, the assembly 20 may comprise a series of vertically stacked filter plates 28 of relatively shallow inverted cup-shaped configuration. The filter plates are stacked upon bottom plate 24 and are preferably formed of a suitable synthetic plastic. Each filter plate comprises a substantially horizontal wall 29 having a central aperture 30. The aperture 30 is surrounded by a circular inner vertical wall 31 having an upwardly inclined opening 32 therein adjacent the undersurface of horizontal wall 29.

Figure 2:
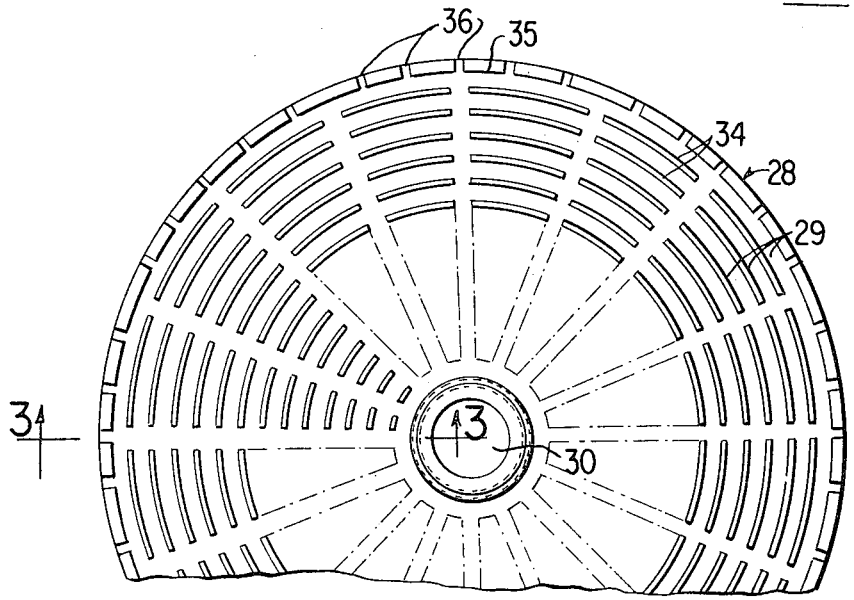
FIG. 2 is a partial top plan view of a filter plate included in the filter device of FIG. 1.
Figure 3:
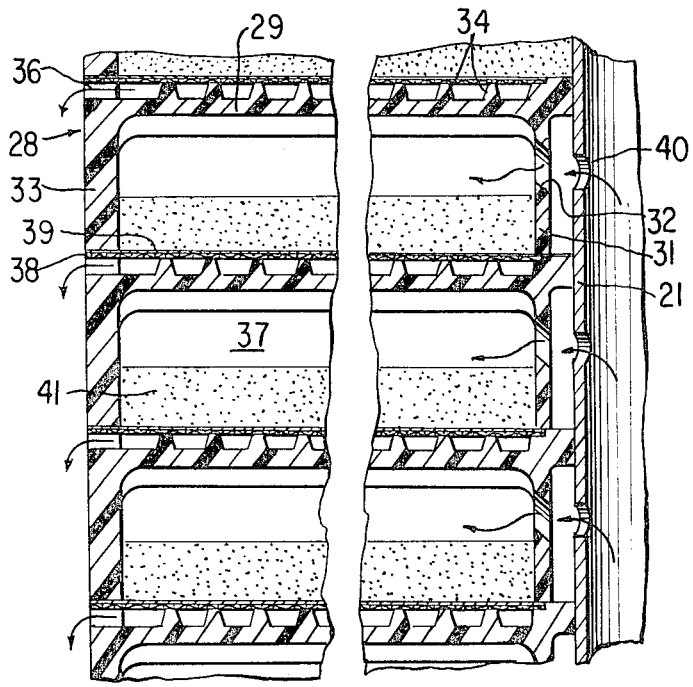
FIG. 3 is an enlarged fragmentary sectional view showing the details of a portion of the filter element assembly illustrated in FIG. 1.

On the outer periphery of filter plate 28 is an outer vertical side wall 33. On the top surface of horizontal wall 29 there are provided a plurality of concentric radially spaced discontinuous ribs which may be seen in FIG. 2 and are indicated at 34. On the peripheral edge of the upper surface of horizontal wall 29, there is provided a raised rim 35 with a plurality of non-uniformly spaced slots or openings 36 therein. The rim 35 is of substantially uniform height and thickness and forms the basic supporting structure for the outer vertical wall of the next higher filter plate.

The stacked filter plates 28 thus define filter spaces 37 within each filter plate with the filter space opening downwardly to the top surface of the horizontal wall of the next lower filter plate. In the bottom portion of each filter space 37 a separator screen 38 rests upon the raised ribs 34 and rim 35 and supports a filter sheet 39 of either cloth or paper.

As may be seen in FIG. 1 the inlet tube 21 is provided with radially communicating openings 40 so that the liquid to be filtered can flow radially outward from inlet tube 21, openings 32, and into the filter space 37 defined under each of the filter plates. The openings 36 in the raised rim or rib 35 communicate with the spaces defined between ribs 34 on the top wall of the corresponding filter plate and below the screen 38 resting upon these ribs. As a result of this construction the filtrate exits from the filter spaces 37 only by passing downwardly through the filter cake, 41, filtering material 39, and separator screen 38 to flow radially outwardly on the top surface of horizontal wall 29 and then from the assembly through the slots 36 in ribs 35. As the filtrate leaves the assembly it flows downwardly through an annular space 42 formed between the outer surface of the assembly 20 and the inner surface of tank side wall 2. The filtrate is then withdrawn through outlet 17 and removed through pipe 18.

The filter assembly 20 is completed by a top plate 43 having a central hollow hub 44 that slidably engages on a threaded extension 45 welded to the upper end of the inlet tube 21. A nut 46 on the extension 45 engages the hub 44 and urges the hub and top plate 43 to seat against the upper surface of the uppermost filter plate 28. The top plate 43 may be provided with a plurality of hooks or the like 47 by which the filter element assembly 20 can be lifted as a unit into or out of the open tank.

The liquid to be filtered enters the filter plates 28 under a relatively high pressure and the discharged filtrate through the openings 36 into the annular space 42 bounded by the tank wall is under a substantially reduced pressure because of the resistance to the flow of the filtrate imposed by the filtering medium. It is therefore apparent that the internal pressures exerted upon the tank in a filter device according to the present invention are relatively low.

Thus it can be seen that the present invention greatly increases the efficiency of a filtering operation by providing that all of the filtrate exiting from the filter spaces passes downwardly through the filtering material and outwardly through openings positioned below the sheet of filtering material and the separator screen. The filtrate flows radially outwardly on the top wall of the filter plate through the passages defined by the discontinuous circular ribs on the top wall. The filter plates are preferably formed of a synthetic plastic material but it is to be understood that other suitable materials such as metals could also be used.

It is to be understood that various details of construction and arrangement of parts can be made without departing from the spirit of the invention except as defined in the appended claims.

What is claimed is:

1. In a filter element assembly for a pressure filter device, the combination of a plurality of cup-shaped filter plates vertically stacked in inverted positions, each plate having a substantially horizontal wall with an outer vertical side wall at the peripheral edge thereof and an inner circular vertical wall adjacent and surrounding the center thereof, said filter plates being so positioned that a filter space within each plate opens downwardly to the top horizontal wall of the next lower filter plate, there being a plurality of concentric, radially spaced, discontinuous circular ribs on the tops of the horizontal walls of said filter plates, separator screen means at the bottom of each filter space and resting upon the ribs of the next lower filter plate, a sheet of filtering material at the bottom of each filter space positioned upon each separator screen means, inclined means in said inner vertical walls for introducing into said filter spaces above the sheets of filtering material a liquid to be filtered, the solids filtered from said liquid being deposited on said filtering material and progressively forming a filter cake thereon, the outer peripheral edge of said horizontal wall of each filter plate constituting a raised rim in alignment with said outer vertical side wall thereof, said rim supporting the outer edges of said filtering material and separating screens and the lower edge of the vertical wall of the next higher filter plate, there being a multiplicity of openings in said rim separated by relatively short segmental rim portions so that the filtrate passing through said sheets or filtering material exits from the assembly through said openings.

2. In a filter assembly as claimed in claim 1 wherein said segmental rim portions vary in width relative to said circular ribs.

3. In a filter element assembly as claimed in claim 1 wherein the openings of said rim are non-uniformly spaced around the peripheries of said filter plates.

References Cited

UNITED STATES PATENTS

| | | | |
|---|---|---|---|
| 1,202,109 | 10/1916 | Sellenscheidt | 210—344 |
| 2,903,136 | 9/1959 | Buckman | 210—344 X |
| 3,141,845 | 7/1964 | Nadherny | 210—344 X |
| 3,240,344 | 3/1966 | Hoelscher | 210—344 X |
| 3,319,794 | 5/1967 | Gross | 210—344 X |
| 3,343,681 | 9/1967 | Madden | 210—344 X |

REUBEN FRIEDMAN, *Primary Examiner.*

FRANK A. SPEAR, JR., *Assistant Examiner.*

U.S. Cl. X.R.

210—456